United States Patent [19]

Hazen

[11] Patent Number: 4,656,798
[45] Date of Patent: Apr. 14, 1987

[54] CLOSURE MEMBER FOR AN ELECTRICAL ACTIVATING ASSEMBLY

[75] Inventor: John O. Hazen, Monaca, Pa.
[73] Assignee: H. H. Robertson Company, Pittsburgh, Pa.
[21] Appl. No.: 853,058
[22] Filed: Apr. 17, 1986
[51] Int. Cl.⁴ .......................... E04F 19/08; H02G 3/08
[52] U.S. Cl. ......................................... 52/221; 174/48
[58] Field of Search ...................... 52/221; 174/48, 49, 174/50, 65 R, 57, 58, 65 SS, 65 G

[56] References Cited

U.S. PATENT DOCUMENTS

| | | | |
|---|---|---|---|
| 3,932,696 | 1/1976 | Fork et al. | 174/48 |
| 4,232,493 | 11/1980 | Gray | 52/221 |
| 4,237,666 | 12/1980 | Kohaut | 52/221 |
| 4,264,719 | 4/1981 | Rhodes | 52/221 |
| 4,324,078 | 4/1982 | Gray | 52/221 |
| 4,355,197 | 10/1982 | Jonsson | 174/48 |

OTHER PUBLICATIONS

Midland-Ross Corporation Catalog No. 85725-1 entitled "Mutl-A-Cell II" issued 1985.

Primary Examiner—John E. Murtagh
Attorney, Agent, or Firm—G. E. Manias

[57] ABSTRACT

A closure member for an electrical activating assembly of the type to be installed in an electrical wire distributing floor structure. The closure member has an access port assembly supported for movement between an open position wherein wires may egress from the closure member, and a closed position. The access port assembly incorporates a resilient filler strip formed from heat resistant material. The filler strip is pre-slit to provide effective sealing around egressing wires independent of the diameter of the wire.

10 Claims, 17 Drawing Figures

CLOSURE MEMBER FOR AN ELECTRICAL ACTIVATING ASSEMBLY

BACKGROUND OF THE INVENTION

1. Field of the Invention

This invention relates generally to electrical wiring distributing floor structures, and more particularly to improvements in a closure member presented at the surface of such a floor structure, wherein a seal is provided around the wires egressing from the closure member.

2. Description of the Prior Art

It is a common practice to provide plural preset inserts throughout the floor area of an electrical wiring distributing floor structure. Each preset insert is intended to provide access to plural electrical services. When activating a preset insert, an activating assembly is provided which includes a closure member presented at the surface of the floor structure. Connections to the electrical services are made within the preset insert with the wires egressing through the cover.

In order to maintain the fire resistance rating of the floor structure, the areas around the wires egressing from the cover, must be sealed. One method of obtaining the required seal is to field-cut holes in the cover which closely fit the emerging wires, see for example U.S. Pat. No. 3,932,696 (FORK et al). In addition, a strip of fire resistant material can be placed within the interior of the preset insert to shield the upper portion of the preset insert and the cover from heat transfer by convection and by radiation, see U.S. Pat. No. 4,324,078 (GRAY). The main disadvantage of the FORK et al.'696 and GRAY'078 arrangements is that a new cover member must be installed in either of two circumstances. That is where a connection is broken and the wire is removed leaving an unfilled hole in the cover member; or where a wire of lesser diameter egresses through a previously cut, larger diameter hole in the cover member.

Flush floor fittings are known wherein the overlying carpeting surrounds the emerging wires, see U.S. Pat. No. 4,237,666 (KOHAUT). The KOHAUT'666 arrangement is directed to the aesthetic appearance of the carpeting in the area of each preset insert. The KOHAUT'666 reference is not concerned with the fire resistance of the floor structure.

A closure member is known having a retractable access port which is positionable between a closed position wherein the port is flush with the cover member and an open position wherein the port projects upwardly from the cover member to allow egress of wiring, see Catalog No. 85725-1 entitled "MULT-A-CELL II", issued in 1985 by MIDLAND-ROSS CORPORATION. The retractable access port is provided with a dust seal said to be formed from a foam plastomer. The MIDLAND-ROSS publication does not discuss the affect of the foam plastomer dust seal on the fire resistance of the floor.

BRIEF SUMMARY OF THE INVENTION

The principal object of this invention is to provide an improved closure member of the type having an open/close access port.

Still another object of this invention is to provide an improved closure member wherein the open/close access port provides an effective seal around the wires egressing from the access port.

The present invention provides a closure member for an electrical activating assembly comprising a plate member having a recess along one edge portion, and an access port assembly supported in the recess for movement between a closed position wherein the access port assembly is flush with the plate member and an open position wherein the access port assembly projects upwardly from the plate member to allow passage of emerging wires. The present invention provides an improvement wherein the access port assembly comprises a housing presenting a top wall having a front edge and a rear edge, a bottom wall inclined downwardly from the rear edge of the top wall and extending forwardly of the rear edge and spaced from the front edge, end walls, and plural egress slots extending inwardly from that edge of the bottom wall remote from the rear edge, that is, the front edge of the bottom wall. A resilient filler strip is provided which overlies the bottom wall and covers the egress slots. Retainer means is provided retaining the filler strip engaged with the bottom wall. The arrangement is such that with the access port assembly in an the open position, wires may extend outwardly through the access slots and the filler strip, area around each emerging wire being effectively sealed by the resilient filler strip independently of the wire diameter. To facilitate passage of the wires through the filler strip, slits are provided, one confronting each of the egress slots.

DESCRIPTION OF THE PREFERRED EMBODIMENT(S)

Figure 1:
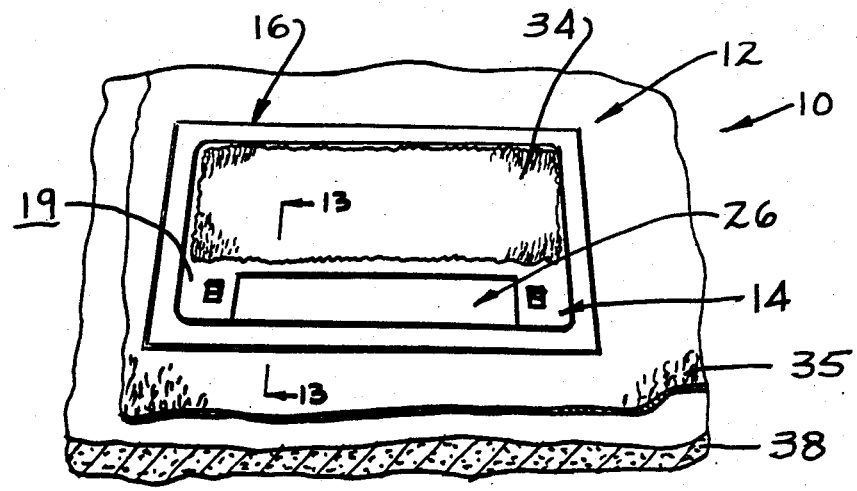
FIGS. 1 and 2 are fragmentary perspective views of a floor structure presenting an electrical activating assembly incorporating the present closure member.
Figure 2:
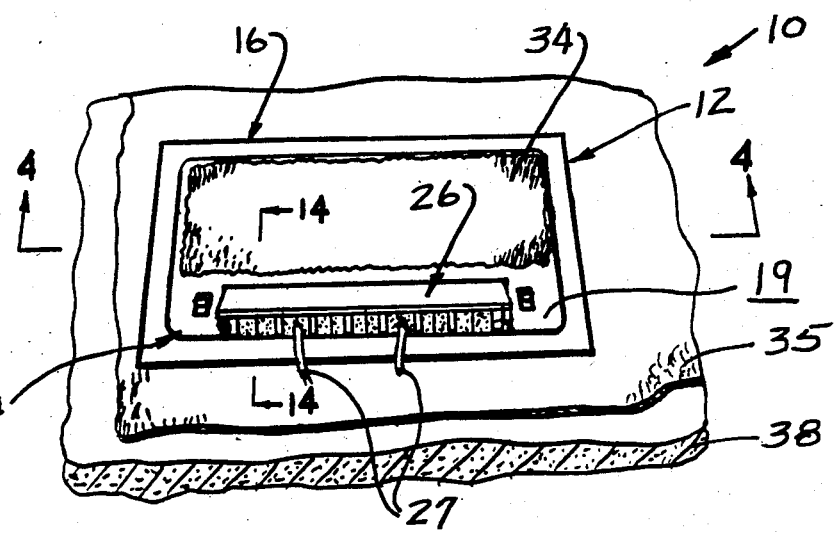

FIGS. 1 and 2 illustrate a floor structure 10 presenting an electrical activating assembly 12 of the type comprising a closure member 14 supported on and connected to a finishing ring 16.

Figure 3:
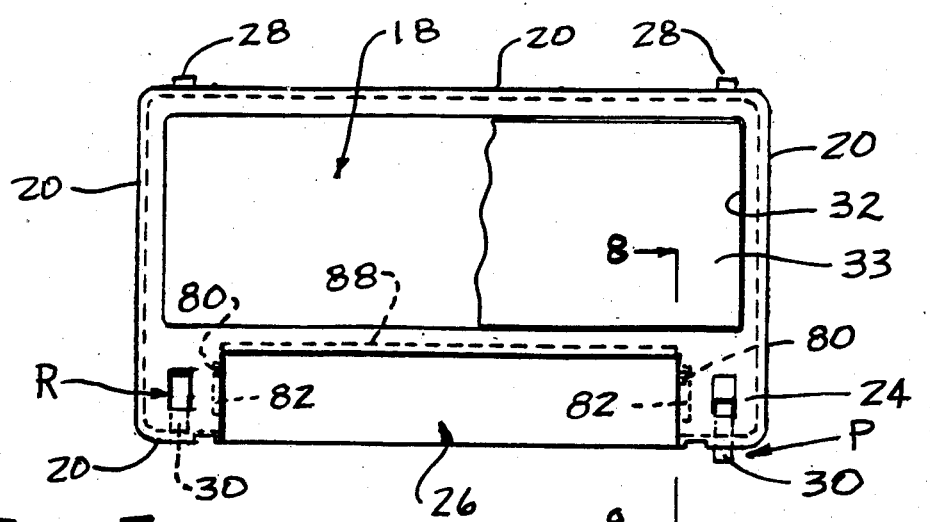
FIG. 3 is a plan view of the present closure member.

The closure member 14 (FIG. 3) comprises a plate member 18 having perimeter edges 20 and a recess 22 along an edge portion 24. An access port assembly 26 is supported in the recess 22 for movement between a closed position (FIG. 1) wherein the access port assembly 26 is substantially flush with the upper surface 19 of the closure member 14; and an open position (FIG. 2) wherein the access port assembly 26 projects upwardly from the upper surface 19 of the closure member 14 to allow egress of electrical wires 27 as shown in FIG. 2. The plate member 18 presents lugs 28 along that edge 20 remote from the access port assembly 26. The lugs 28 are positioned to hook under an edge of the finishing ring 16. The plate member 18 also presents latch elements 30 in the edge portion 24 which are slideable between a recessed position R and the projecting position P illustrated in FIG. 3. The lugs 28 and the latch elements 30 cooperate to removably secure the closure member 14 to the finishing ring 16. The plate member 18 may include a depression 32 adapted to receive either a piece of carpeting 34 (FIG. 2) matching the carpeting 35 surrounding the finishing ring 16 and overlying the floor structure 10; or a plastic cover infill piece 33 (a fragment of which is illustrated in FIG. 3) matching the cover member 18 in texture and color.

The floor structure 10 (FIG. 4) comprises a metal subfloor 36 and an overlying layer of concrete 38. The metal subfloor 36 includes metal cellular units 40, only one of which is visible in FIG. 4. The unit 40 presents generally parallel enclosed cells including lateral cells 42, 44 and a central cell 46. The metal subfloor 36 may consist entirely of metal cellular units 40 or may consist of cellular units and non-cellular units comingled to provide the desired distribution pattern.

Figure 4:
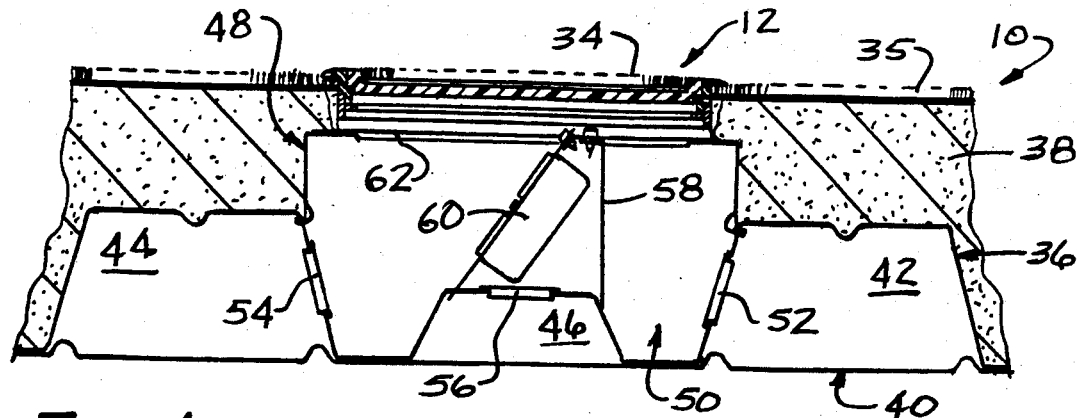
FIG. 4 is a cross-sectional view, taken along the line 4—4 of FIG. 2, further illustrating the floor structure.

As shown in FIG. 4, a preset housing 48 is installed over the cellular unit 40 and spans between the lateral cells 42, 44. The housing 48 encloses a trough space 50 within which is presented access openings 52, 54 in the lateral cells 42, 44, and an access opening 56 in the central cell 46. A receptacle support 58 disposed within the housing 48 and above the central cell 46, supports one or more duplex receptacles 60. The activating assembly 12 proVides access to the trough space 50 (hereinafter also referred to as the chamber 50) through an outlet opening 62 in the top of the housing 48.

Figure 5:
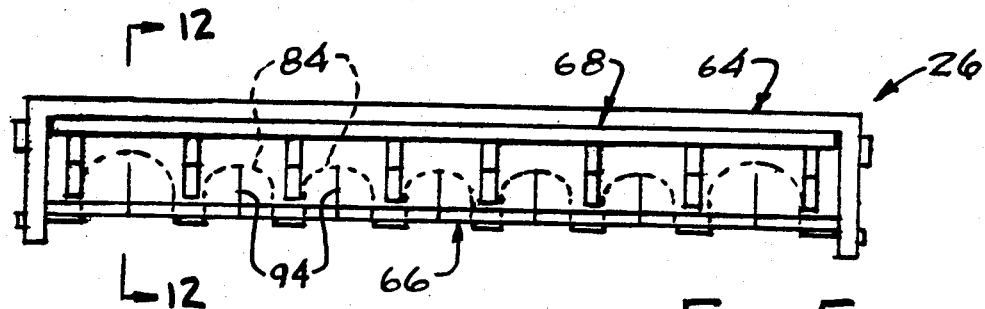
FIG. 5 is a front view of the access port assembly.

Referring to FIG. 5, the access port assembly 26 comprises an access port housing 64, a resilient filler strip 66, and retainer means 68 retaining the filler strip 66 within the access port housing 64.

Figure 6:
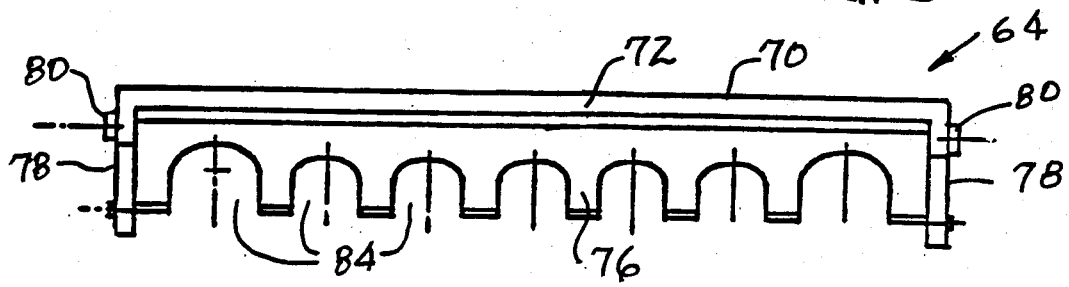
FIGS. 6 and 7 are front and end views, respectively, of the access port housing.
Figure 7:
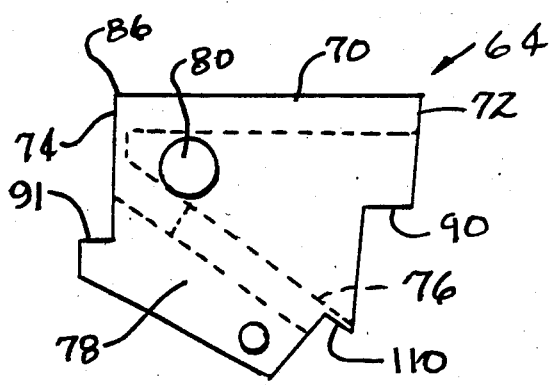
Figure 8:
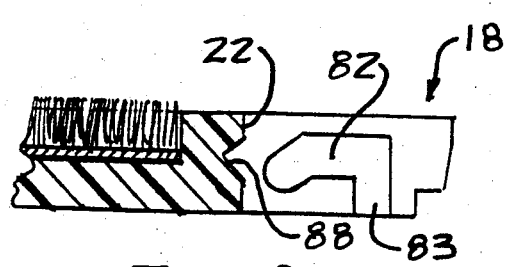
FIG. 8 is a fragmentary cross-sectional view, taken along the line 8—8 of FIG. 3.

The access port housing 64 (FIGS. 6 and 7) comprises a top wall 70 having front and rear edges 72, 74; a bottom wall 76 which, as best shown in FIG. 7, is inclined downwardly from the rear edge 74 of the top wall 70, extends forwardly of the rear edge 74 and is spaced from the front edge 72; and end walls 78. Coaxially aligned pivot pins 80 provided in the wall 78, are introduced into grooves 82 through entrance grooves 83 provided in the sides of the recess 22 of the plate member 18, see FIGS. 3 and 8. The access port housing 64 may be formed from a theremoplastic polyester material.

As best shown in FIG. 6, plural egress slots 84 are provided along the length of the bottom wall 76. The slots 84 extend inwardly from that edge of the bottom wall 76 which is remote from the rear edge 74. The egress slots 84 allow free passage of wires from the chamber 50 through the access port assembly 26. Therefore the need for field-cutting openings in the cover as required in prior art devices has been eliminated.

Figure 13:
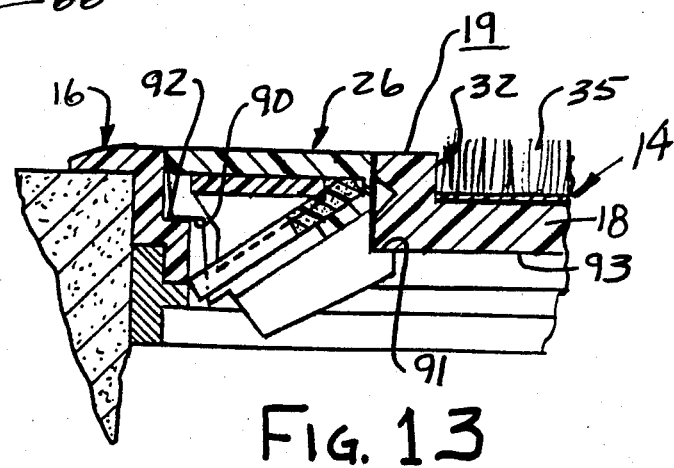
FIG. 13 is a fragmentary cross-sectional view, taken along the line 13—13 of FIG. 1, illustrating the access port assembly in a closed position.
Figure 14:
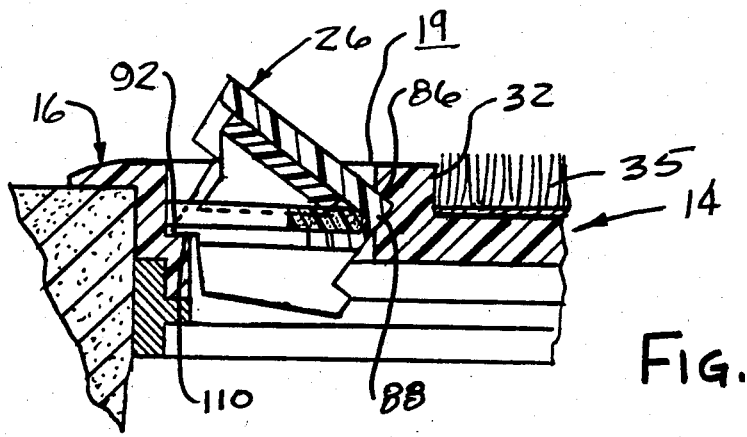
FIG. 14 is a fragmentary cross-sectional view, taken along the line 14-14 of FIG. 2, illustrating the access port assembly in an open position.

Each end wall 78 presents a corner portion 86 and a downwardly facing surface 110. The corner portion 86 is introduced into a corner receiving notch 88 (FIG. 8) provided in the recess 22 of the cover plate 18 while the surface 110 engages a shoulder 92 of the finishing ring 16 to maintain the access port assembly 26 in the open position illustrated in FIG. 14. Each end wall 78 also presents downwardly and upwardly facing surfaces 90, 91 (FIG. 7) which, as shown in FIG. 13, engage, respectively, a shoulder 92 of the finishing ring 16 and the bottom face 93 of the plate member 18 thereby supporting the access port assembly 26 in the closed position and such that the latch elements 30 may engage the slots of the finishing ring 16.

Figure 9:
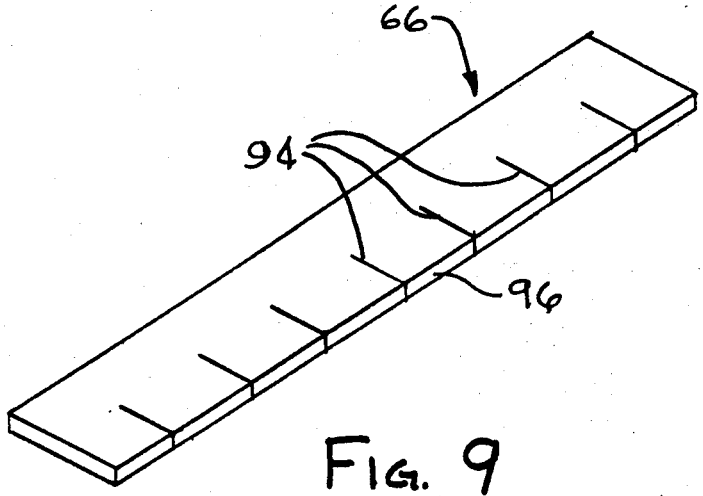
FIG. 9 is an isometric view of a resilient filler strip.
Figure 12:
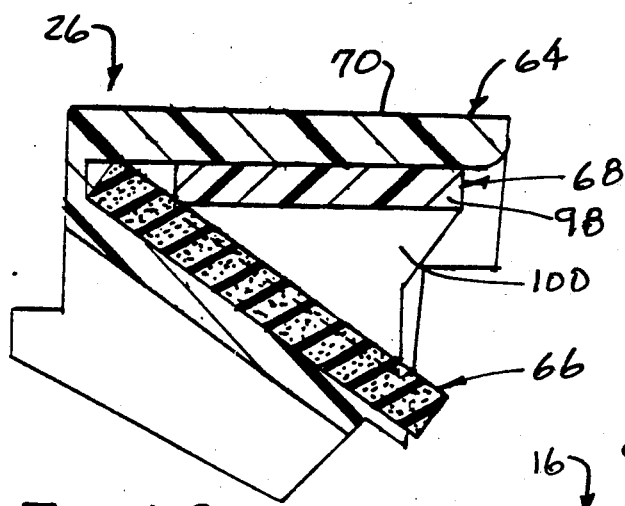
FIG. 12 is a cross-sectional view, taken along the line 12—12 of FIG. 5, further illustrating the access port assembly.

FIG. 9 illustrates the resilient filler strip 66 which is provided with plural slits 94 each extending inwardly from a forward edge 96. As seen in FIG. 5, each of the slits 94 confronts one of the egress slots 84 thereby facilitating passage of wiring through the filler strip 66 while at the same time providing an effective seal around each wire independent of the diameter of the wire. The filler strip 66 may be formed from any suitable resilient and fire resistant material. The filler strip 66 preferably is formed from a closed cell silicone sponge material having a thickness of about $\frac{1}{8}$" and being capable of withstanding temperatures in the range of from $-193$ to $+450$ degrees Fahrenheit. As shown in FIG. 12, the filler strip 66 overlies the bottom wall 76 of the access port housing 64 and is retained in position by the retaining means 68.

Figure 11:
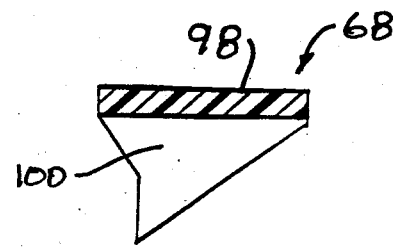
FIG. 11 is a cross-sectional view, taken along the line 11—11 of FIG. 10.
Figure 10:
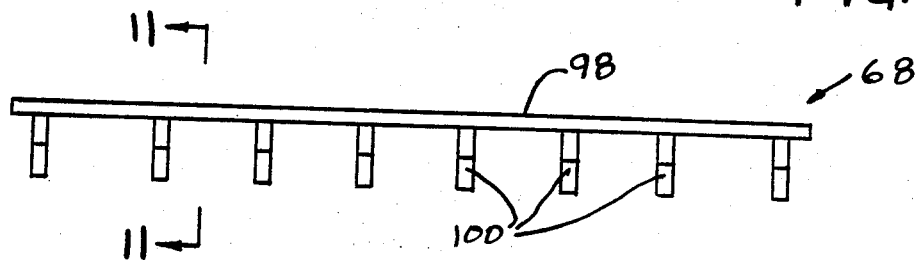
FIG. 10 is a front view of retainer means.

Referring to FIGS. 10 and 11, the retaining means 68 comprises a top plate 98 having plural flanges 100 spaced along the length thereof and depending downwardly therefrom. The retainer means 68 may be formed as an integral unit from a thermoplastic polyester material. As best seen in FIG. 12, the top plate 98 of the retainer means 68 engages the top wall 70 of the access port housing 64 and is positioned such that the flanges 100 thereof engage and compress the filler strip 66 thereby retaining the same in position. The retainer means 66 is most conveniently secured to the access port housing 64 by sonic welding but may be secured by any other suitable means.

Figure 15:
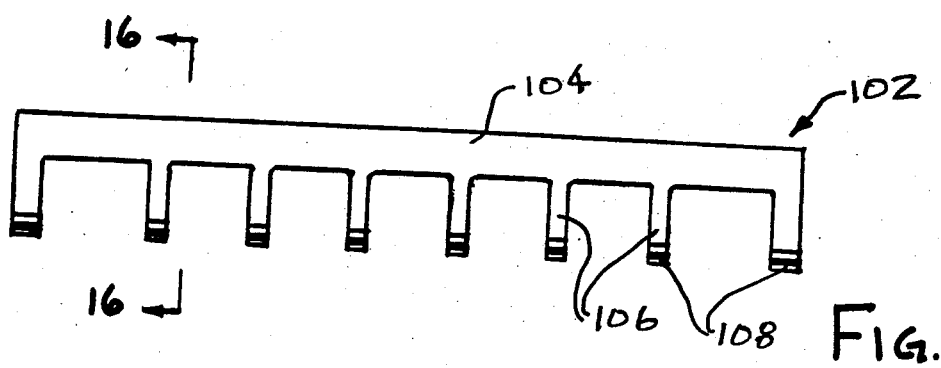
FIG. 15 is a plan view illustrating an alternative embodiment of the retainer means.
Figure 16:
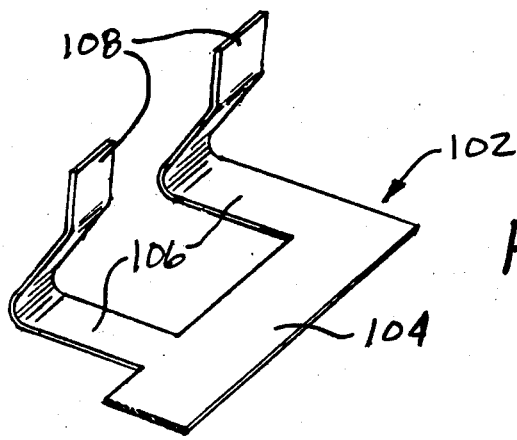
FIG. 16 is a fragmentary isometric view as viewed from the line 16—16 of FIG. 15.
Figure 17:
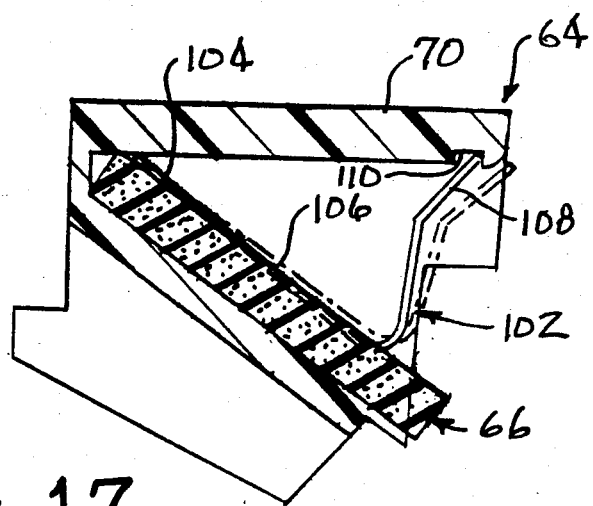
FIG. 17 is a fragmentary cross-sectional view, similar to FIG. 12, illustrating an access port assembly incorporating the retainer means of FIG. 15.

Alternatively, the retainer means 68 may take the form of a metal spring clip 102 (FIGS. 15 and 16) including a plate portion 104 presenting plural fingers 106 extending from one edge thereof. The fingers 108 terminate in upturned end portions 108. When installed in the access port housing 64 (FIG. 17), the plate portion 104 and the fingers 106 overlay and compress the filler strip 66. The end portions 108 are retained in a groove 110 formed in the lower face of the top wall 70.

I claim:

1. In a closure member for an electrical activating assembly comprising a plate member having a recess along one edge portion; and an access port assembly supported in said recess for movement between a closed position wherein said access port assembly is flush with said plate member and an open position wherein said access port assembly projects upwardly from said plate member; the improvement wherein said access port assembly comprises:

an access port housing including a top wall having a front edge and a rear edge, a bottom wall inclined downwardly from said rear edge of said top wall and extending forwardly of said rear edge and spaced from said front edge, end walls, and plural egress slots extending inwardly from that edge of said bottom wall remote from said rear edge;

a resilient filler strip overlying said bottom wall and covering said egress slots; and retainer means retaining said filler strip engaged with said bottom wall.

2. The closure member of claim 1 including slits in said filler strip, one confronting each of said egress slots.

3. In a closure member for an electrical activating assembly comprising a plate member having a recess along one edge portion; and an access port assembly supported in said recess for movement between a closed position wherein said access port assembly is flush with said plate member and an open position wherein said access port assembly projects upwardly from said plate member; the improvement wherein said access port assembly comprises:

an access port housing including a top wall having a front edge and a rear edge, a bottom wall inclined downwardly from said rear edge of said top wall, end walls, and plural egress slots extending inwardly from that edge of said bottom wall remote from said rear edge;

a resilient filler strip overlying said bottom wall and covering said egress slots, said filler strip comprising a fire resistant silicone sponge; and retainer means retaining said filler strip engaged with said bottom wall.

4. The closure member of claim 1 wherein said retainer means comprises a top plate secured to a lower face of said top wall, and plural flanges depending from said top plate into engagement with said filler strip.

5. The closure member of claim 4 wherein said filler strip is compressed between said flanges and said bottom wall.

6. The closure member of claim 4 wherein said access door and said retainer means are formed from plastic material, said top plate being secured to said top wall by sonic welding.

7. In a closure member for an electrical activating assembly comprising a plate member having a recess along one edge portion; and an access port assembly supported in said recess for movement between a closed position wherein said access port assembly is flush with said plate member and an open position wherein said access port assembly projects upwardly from said plate member; the improvement wherein said access port assembly comprises:

an access port housing including a top wall having a front edge and a rear edge, a bottom wall inclined downwardly from said rear edge of said top wall, end walls, and plural egress slots extending inwardly from that edge of said bottom wall remote from said rear edge;

a resilient filler strip overlying said bottom wall and covering said egress slots; and retainer means retaining said filler strip engaged with said bottom wall, said retainer means comprising a metal clip including a plate portion and plural fingers extending from one edge thereof, said plate portion residing adjacent to said rear edge, said plate portion and said fingers overlying said filler strip, said fingers terminating in upturned end portions engaged with said top wall.

8. The closure member of claim 7 wherein said metal clip is formed from spring steel.

9. The closure member of claim 7 wherein said plate presents a groove along its length, said end portions being received in and retained by said groove.

10. The closure member of claim 7 wherein said filler strip is compressed between said plate portion and said fingers of said metal clip and said bottom wall.

* * * * *